(12) United States Patent
Saito et al.

(10) Patent No.: US 8,827,305 B2
(45) Date of Patent: Sep. 9, 2014

(54) HAND TRUCK

(75) Inventors: Akinori Saito, Tokyo (JP); Tohru Matsumoto, Chiba (JP)

(73) Assignee: Nansin Co., Ltd, Tokyo (JP)

( * ) Notice: Subject to any disclaimer, the term of this patent is extended or adjusted under 35 U.S.C. 154(b) by 81 days.

(21) Appl. No.: 13/504,624

(22) PCT Filed: Oct. 27, 2010

(86) PCT No.: PCT/JP2010/069116
§ 371 (c)(1),
(2), (4) Date: Apr. 27, 2012

(87) PCT Pub. No.: WO2011/052660
PCT Pub. Date: May 5, 2011

(65) Prior Publication Data
US 2012/0211970 A1 Aug. 23, 2012

(30) Foreign Application Priority Data
Oct. 28, 2009 (JP) ................................. 2009-248336

(51) Int. Cl.
*B62B 5/06* (2006.01)
*B62B 3/14* (2006.01)

(52) U.S. Cl.
CPC .................... *B62B 5/067* (2013.01); *B62B 3/1476* (2013.01)
USPC .................... 280/655.1; 280/79.11

(58) Field of Classification Search
None
See application file for complete search history.

(56) References Cited

U.S. PATENT DOCUMENTS

| 5,114,164 | A | * | 5/1992 | Bothwell et al. | 280/37 |
| 5,116,289 | A | * | 5/1992 | Pond et al. | 190/18 A |
| 5,911,424 | A | * | 6/1999 | Rovinsky | 280/79.11 |
| 6,024,376 | A | * | 2/2000 | Golichowski et al. | 280/655.1 |
| 6,692,011 | B2 | * | 2/2004 | Carlson et al. | 280/79.2 |
| 6,877,764 | B2 | * | 4/2005 | Sagol | 280/655.1 |
| D570,068 | S | * | 5/2008 | Dukes | D34/17 |
| D579,619 | S | * | 10/2008 | Gu | D34/17 |

FOREIGN PATENT DOCUMENTS

| JP | 61-087769 U | 6/1986 |
| JP | 63-130472 A | 6/1988 |
| JP | 02-048474 U | 4/1990 |
| JP | 04-183672 A | 6/1992 |
| JP | 2003-118582 A | 4/2003 |
| JP | 2010-155587 A | 7/2010 |

OTHER PUBLICATIONS

International Search Report of PCT/JP2010/069116, mailed Dec. 7, 2010.

* cited by examiner

*Primary Examiner* — Katy M Ebner
(74) *Attorney, Agent, or Firm* — Westerman, Hattori, Daniels & Adrian, LLP

(57) ABSTRACT

A push handle comprises a pair of column support portions provided on left and right sides and extendable/contractible in a vertical direction, a holding rod portion integrally interposed between upper ends of the pair of column support portions and extends toward left and right outer sides of the column support portions, and column support lock locking an extended posture of the column support portion. A entire length of the column support portion when contracted is set to be shorter than one of longitudinal and lateral lengths of the loading platform surface, an entire length of the holding rod portion is set to be shorter than the other of the longitudinal and lateral lengths of the loading platform surface to allow fitting in an accommodating groove portion when the push handle is folded.

6 Claims, 11 Drawing Sheets

HAND TRUCK

TECHNICAL FIELD

The present invention relates to a hand truck having a handle used for putting and carrying a load.

BACKGROUND ART

Japanese Patent Application Laid-open No. 2003-118582 is known as this type of handle folding type hand truck.

In a hand truck having: a loading platform main body having a loading platform surface; a push handle inclinably attached to the loading platform main body; and wheels rotatably disposed to the loading platform main body, this hand truck adopts a configuration that an end portion of the push handle has: a handle attachment portion that has a tapered cross section and a plurality of vertical grooves formed on an outer peripheral surface thereof along a length direction of the handle; and a spindle body axially supporting the handle attachment portion to allow inclination of the push handle, and the loading platform surface of the loading platform main body has: an attachment hole whose hole diameter is reduced in a depth inserting direction in accordance with the cross-sectional tapered shape of the handle attachment portion and into/from which the handle attachment portion of the push handle end portion can be freely removed/inserted in a vertical direction; and a spindle body accommodating groove that communicates with this attachment hole and accommodates the spindle body included in the handle attachment portion to be movable in the vertical direction.

However, since the push handle is longer than the loading platform main body when folding the push handle in the above-described configuration, the end side thereof protrudes toward the outside of the loading platform surface, resulting in a drawback that compact accommodation cannot be realized.

Further, since the push handle is of the attachment/detachment type, the handle must be removed from the loading platform main body to be accommodated when fitting into the accommodating portion of the loading platform surface, and hence folding or unfolding of the push handle cannot be easily performed.

Patent Document 1: Japanese Patent Application Laid-open No. 2003-118582

DISCLOSURE OF THE INVENTION

Problem to be Solved by the Invention

In view of the above-described problem, it is a main object of the present invention to provide a hand truck that enables compact accommodation by accommodating a push handle so as to be placed in a region of a loading platform surface which is a loading platform upper surface when folding the push handle.

It is another object of the present invention to provide a hand truck that enables pivoting and easy folding and unfolding without removing a push handle from a loading platform portion when folding the push handle.

Means for Solving Problem

To achieve the objects, according to the present invention, there is provided a hand truck comprising: a loading platform portion that has wheels on a lower surface thereof and a loading platform surface on an upper surface thereof; a push handle that has a lower portion pivotally attached to the loading platform portion to be folded or unfolded; and an accommodating groove portion that is provided by recessing the loading platform surface and accommodates the push handle when folding the push handle, wherein the push handle comprises: a pair of column support portions that are provided on left and right sides and extendable/contractible in a vertical direction; a holding rod portion that is integrally interposed between upper ends of the pair of column support portions and extends toward to left and right outer sides of the column support portions; and column support locking means for locking an extended posture of the column support portions, an entire length of the column support portions is set to be shorter than one of longitudinal and lateral lengths of the loading platform surface when contracted, and an entire length of the holding rod portion is set to be shorter than the other of the longitudinal and lateral lengths of the loading platform so that the push handle can be fitted in the accommodating groove portion on the loading platform surface when folded, and a lower part of each column support portion is pivotally attached to the loading platform portion to support the push handle while allowing folding and unfolding and comprises handle unfolding locking means for locking an unfolded posture of the push handle.

Effect of the Invention

In the hand truck according to the present invention, the column support portions are extendable/contractible, and the holding rod portion has a shape extending toward the left and right outer sides of the column support portions, whereby all of the push handle can be fitted in the accommodating groove portion provided on the loading platform surface by contracting the column support portions and folding the push handle.

Further, since the lower end of the push handle is pivotally attached to the loading platform portion, it can be inclined to be folded or raised to be unfolded.

Furthermore, since the wheels can be arranged on the outer side of the column support portions and the inner side of the end of the holding rod portion, a gap between the wheels can be increased as compared with conventional examples, and the loading platform portion can be stably supported.

Moreover, wheel receiving portions are formed on the loading platform surface on the outer side of the accommodating groove portion for the column support portions to achieve stabilization at the time of stacking of the hand truck.

Figure 1:
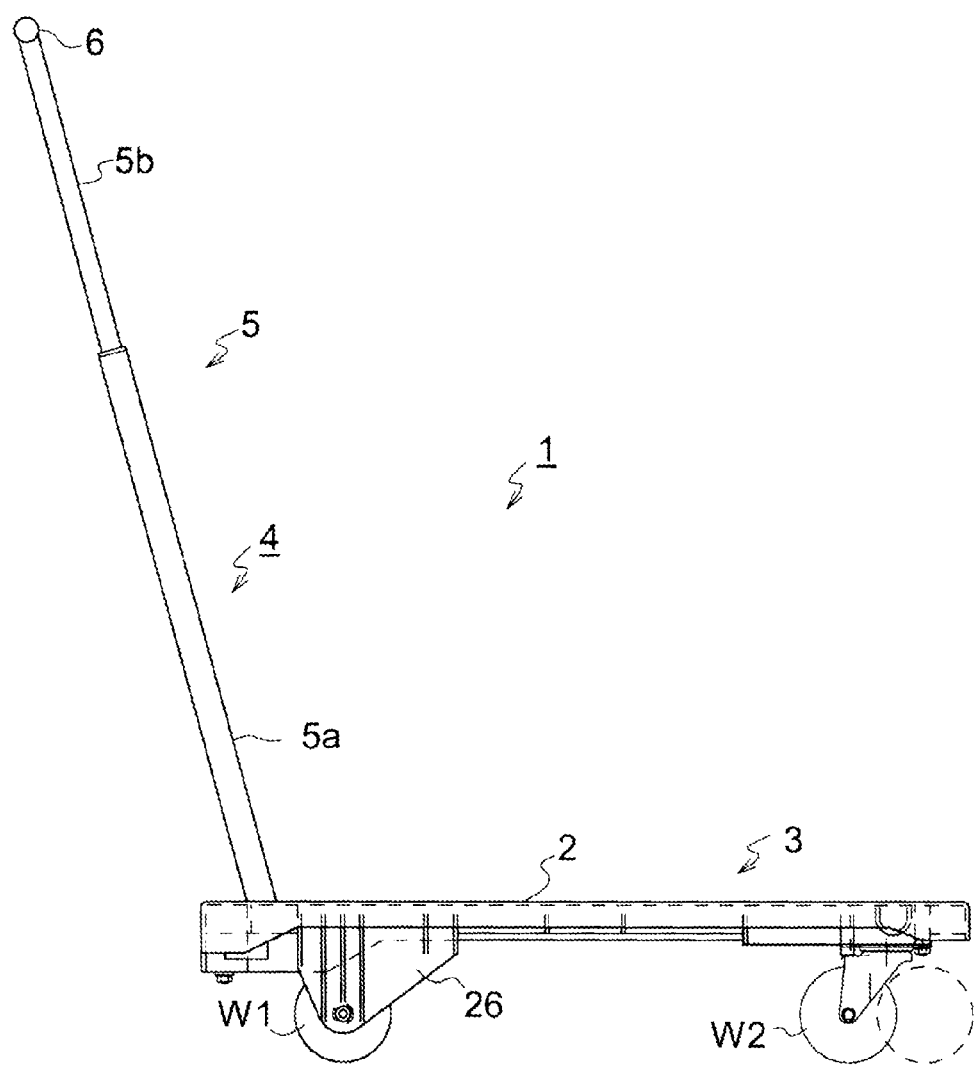
FIG. 1 is a side view showing an embodiment of a hand truck when a push handle is unfolded.

EXPLANATION OF LETTERS OR NUMERALS 1 hand truck
2 loading platform surface
3 loading platform portion
4 push handle
5 column support portion
5a first cylindrical portion
5b second cylindrical portion
6 holding rod portion
7 actuating arm
8 extension lock piece
9 lock hole
11 interlocking rod
12 operating portion
13 latch piece
14 engagement hole
21 column support accommodating grove portion
22 holding rod portion accommodating groove portion
25 wheel receiving portion
26 support yoke
27 holding hole
31 handle attachment hole
32 unfolding lock pin
34 actuating bar
35 unlocking pedal
41 sliding body
41a columnar main body
41c upper contact shaft portion
41b lower contact shaft portion
42 extension unlocking operating portion
42a inclined convex portion
42b fitting groove portion
43 inclined surface

BEST MODE(S) FOR CARRYING OUT THE INVENTION

Preferred embodiments of a hand truck according to the present invention will now be described hereinafter with reference to the drawings.

[Embodiment 1]

As shown in FIG. 1 to FIG. 4, a hand truck 1 has wheels W1 and W2 on a lower surface of a platform thereof, a loading platform surface 3 having a loading platform surface 2 on an upper surface of the same, and a push handle 4 that has a lower portion pivotally attached on the loading platform portion 3 to be folded or unfolded.

[Loading Platform Portion]

The loading platform portion 3 is a platform made of a synthetic resin, the substantially rectangular loading platform surface 2 that serves as a loading surface for goods is provided on an upper surface of the loading platform portion 3, and the wheels W1 and W2 are axially supported at four corners on a lower surface of the same. The loading platform surface 2 has a storage groove portion 20 in which the later-described push handle 4 is inserted to be leveled when folded.

Figure 2:
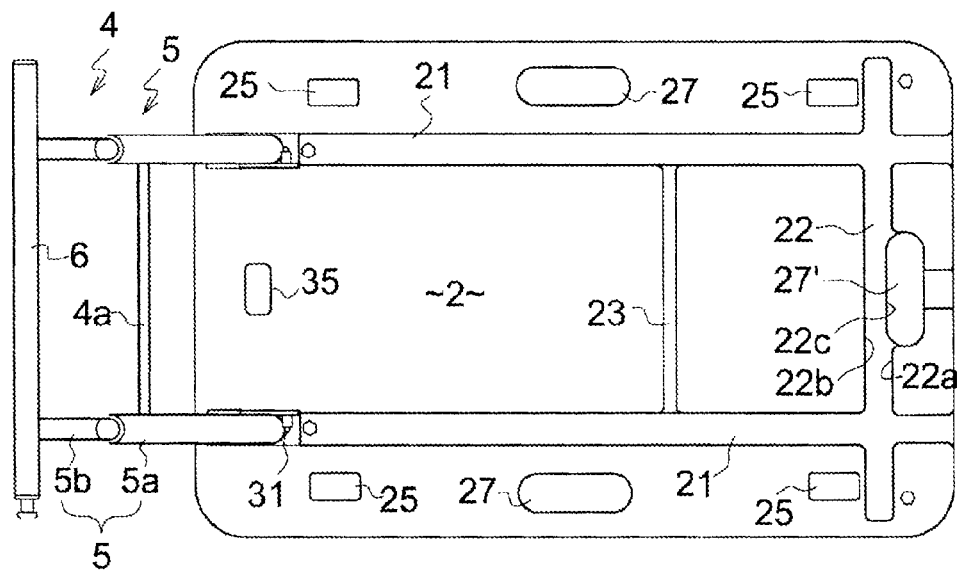
FIG. 2 is a plan view of the hand truck when the push handle is unfolded.
Figure 3:
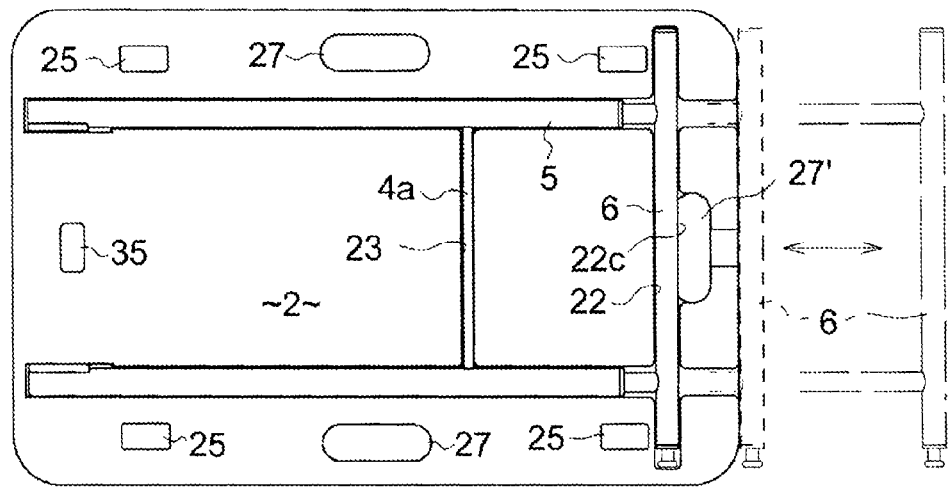
FIG. 3 is a plan view of the hand truck when the push handle is contracted to be folded.

As apparent from FIG. 2 and FIG. 3, an accommodating groove portion is constituted of column support accommodating groove portions 21 in which column support portions 5 are fitted and a holding rod portion accommodating groove portion 22 in which a holding rod portion 6 is fitted.

It is to be noted that reference numeral 23 denotes an auxiliary groove portion in which a stretcher 4a is fitted.

In this embodiment, each column support accommodating groove portion 21 runs from a later-described handle attachment hole 31 provided at a position close to one end of the loading platform surface 2 to the other end of the loading platform surface 2.

Therefore, when not only the column support portions 5 are folded within an area of the loading platform surface 2 in a contracted state as will be described later but they are folded with a length longer than each side of the loading platform surface in a longitudinal direction, the column support portions 5 can be fitted in the column support accommodating groove portions 21 at positions where the column support portions 5 overlap the loading platform surface 2, and the loading platform surface 2 can be substantially expanded by the column support portions 5 and the holding rod portion 6 protruding from the loading platform surface 2 with ends of the column support portions being extended to the outside of the loading platform surface 2 as indicated by an alternate long and short dash line in FIG. 3.

Further, the holding rod portion 6 may be placed at a position where it comes into contact with an end surface of the loading platform portion 3 as indicated by a dotted line in FIG. 3.

The holding rod portion accommodating groove portion 22 is formed in such a manner that the holding rod portion 6 can be fitted when the push handle 4 is contracted as will be described later.

It is to be noted that one (which will be denoted by reference numeral 27' for convenience's sake) of through holding holes 27 that are configured to carry the hand truck 1 when folded is formed at the center on the outer side of the holding rod portion accommodating groove portion 22 so that the holding rod portion 6 buried in the loading platform surface 2 can be easily taken out from the groove 22.

Figure 14:
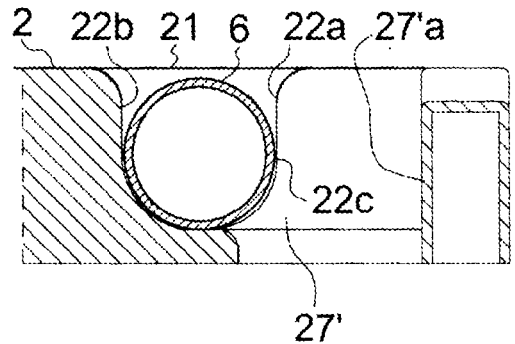
FIG. 14 is cross-sectional views taken along a line B-B in FIG. 12.

That is, as shown in FIG. 14, the holding hole 27' is vertical pierced, and an outer wall portion 22a is notched except an inner wall surface 22b and a groove bottom portion of the holding rod portion accommodating groove portion 22 that is contact with the holding hole 27', whereby a notch portion 22c is formed.

Therefore, the holding rod portion 6 that is fitted in the holding rod portion accommodating groove portion 22 and buried in the loading platform portion 3 can be readily taken out from the holding rod portion accommodating groove portion 22 using the notch portion 22c connected with the holding hole 27'.

Moreover, wheel receiving portions 25 configured to receive the wheels W1 and W2 of a hand truck on an upper stage when the hand trucks 1 are stacked are provided at positions that are present on the outer side of the column support accommodating groove portions 21 and on the slightly inner side of both ends of the holding rod portion accommodating groove portion 22.

Figure 12:
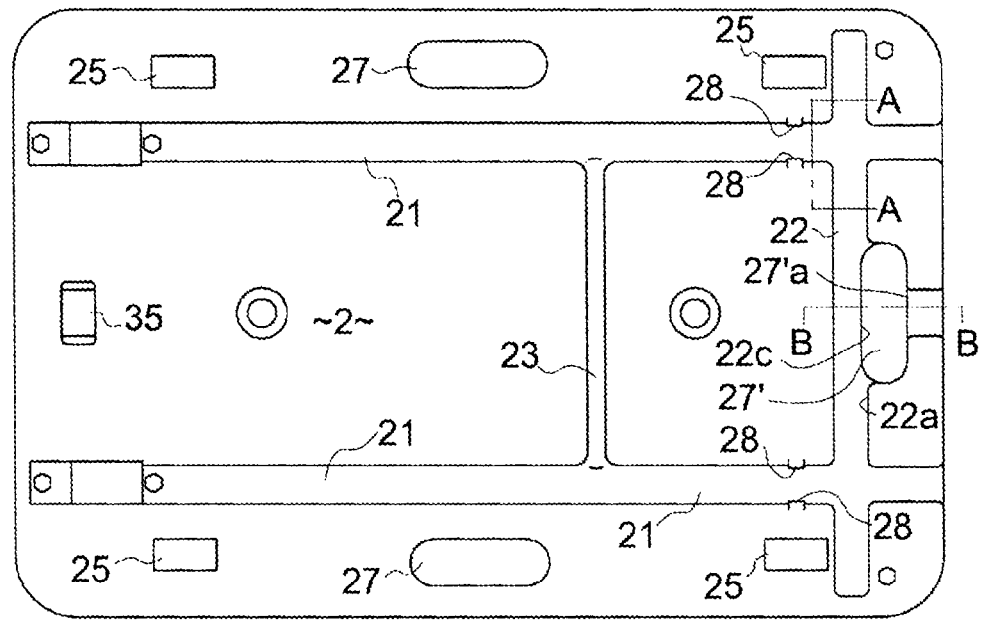
FIG. 12 is a plan view of a hand truck in which a push handle is omitted.
Figure 13:
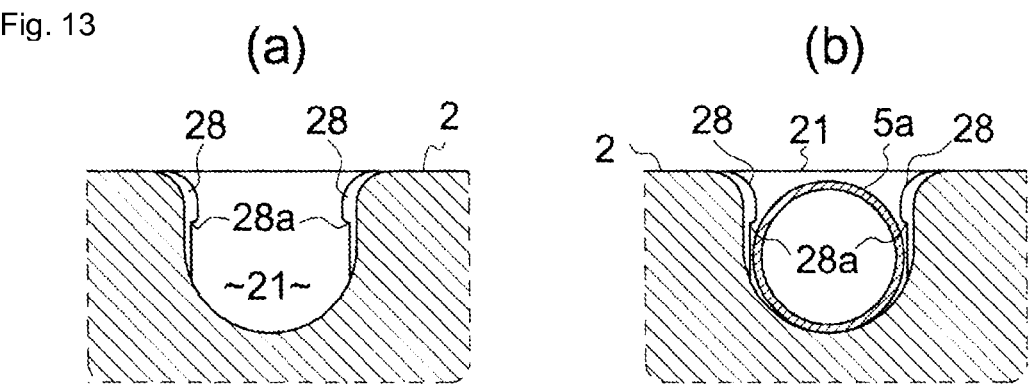
FIG. 13 is cross-sectional views taken along a line A-A in FIG. 12, wherein (a) is a cross-sectional view showing a latch portion of a handle accommodating groove and (b) is a cross-sectional view showing state that the push handle is latched.

Additionally, as shown in FIG. 12 and FIG. 13, it is preferable to provide in the column support accommodating groove portions 21 latch portions 28 each of which is raised to nip and latch each column support of the push handle 4 when fitted.

In the illustrated example, the four latch portions 28 are provided on left and right sidewalls of the pair of column support accommodating groove portions 21 to be aligned on substantially the same line.

As a result, when fitting the column support portions 5 of the folded push handle 4 into the column support accommodating groove portions 21 depicted in FIG. 12 and FIG. 13(a), since each column support portion 5 is pushed into each column support accommodating groove 21 against elastic force of the latch portions 28 while pushing and spreading impingement positions of the latch portions 28, the column support portions 5 are latched and held by the column support accommodating groove portions 21 based on nipping force of the latch portions 28, thereby obtaining a configuration that the push handle 4 cannot be easily unfolded from a state where it is accommodated in the loading platform portion 2 when the push handle 4 is accommodated in the loading platform portion 2 of the truck 1 to be hand-carried.

Here, although arranging the wheels W1 and W2 on the outer side of the push handle 4 leads to stable travelling, since the wheels can be arranged on the inner side of the column support portions alone when the handle has a U-like shape, the loading platform portion 3 has poor stability as a drawback. However, in this embodiment, since the holding rod portion 6 is extended to the outer side of the column support portions 5, the wheels can be arranged on the outer side between the column support portions 5, thereby improving the stability of the loading platform portion 3.

In this embodiment, the wheels on the push handle 4 side are fixed wheels W1, and the wheels on the opposite side are casters W2 capable of swiveling.

The fixed wheel W1 is formed by integrally protruding a support yoke 26 axially supporting the wheel from the back surface of the loading platform portion 3 (see FIG. 1).

[Push Handle]

Figure 4:
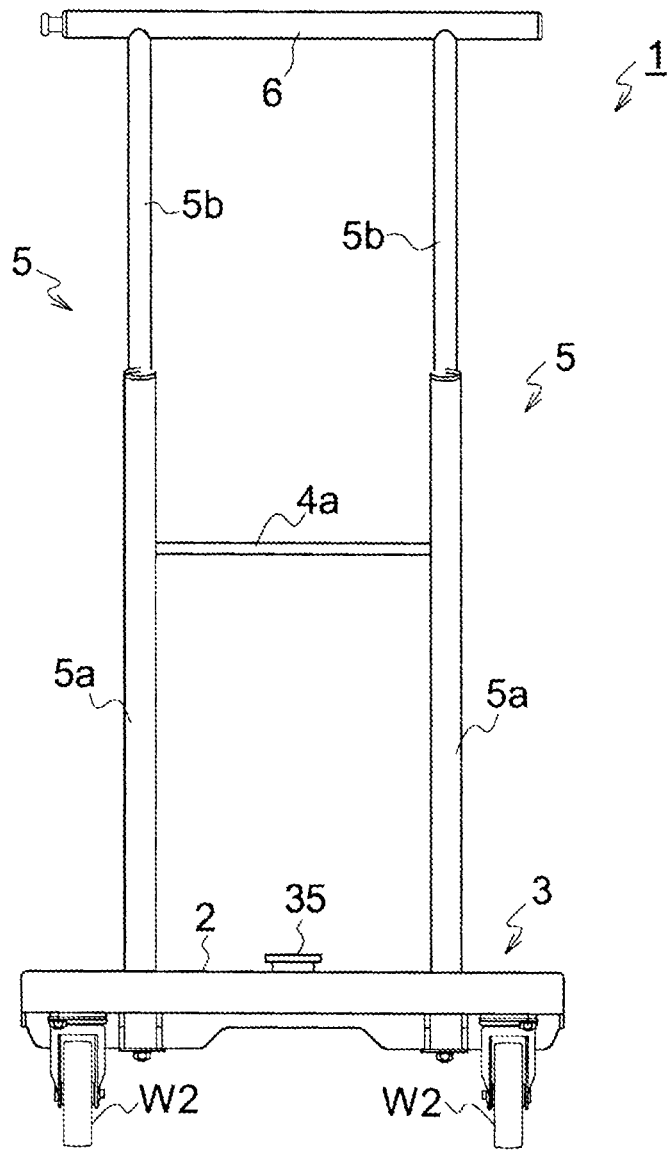
FIG. 4 is a front view of the hand truck.

As shown in FIG. 4, the push handle 4 has the pair of extendable/contractible column support portions 5 provided on the left and right sides and the holding rod portion 6 integrally interposed between upper ends of the pair of column support portions 5, and it includes extendable/contractible means for extending and contracting the column support portions 5 and means for folding or unfolding the push handle 4 with respect to the loading platform portion 3.

[Column Support Portion]

The pair of column support portions 5 are formed of pipes, provided on the left and right sides, and extendable/contractible in the vertical direction, and an entire length from the lower end to the holding rod portion 6 provided at the upper end when contracted is set to be shorter than one of longitudinal and lateral lengths of the loading platform surface.

The column support portions 5 are constituted of a pair of left and right first cylindrical portions 5a pivotally attached P1 to the loading platform portion 3 and second cylindrical portions 5b that are fitted in the first cylindrical portions 5a to be slidable in the vertical direction and have upper ends secured to the holding rod portion 6 to communicate with the same through inner hollows thereof.

[Column Support Locking Means]

Figure 5:
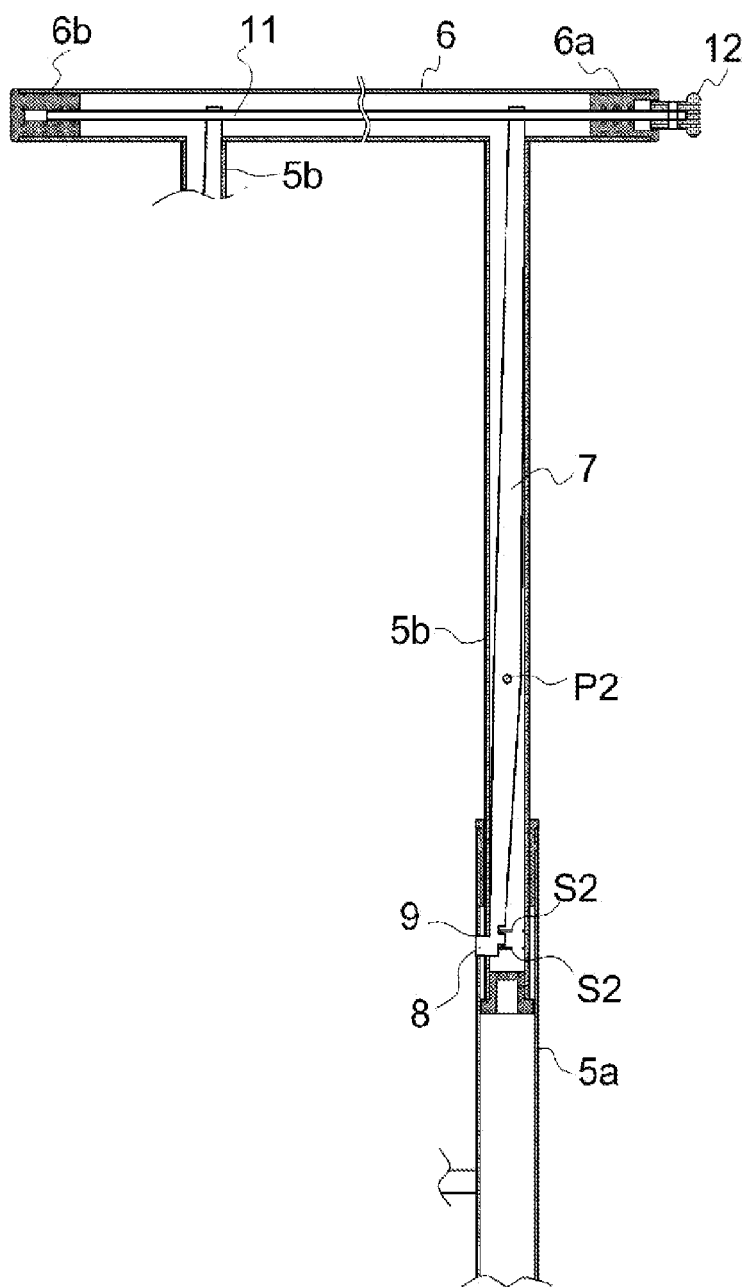
FIG. 5 is a cross-sectional view of a primary part showing a locked state of column support locking means of the push handle.
Figure 6:
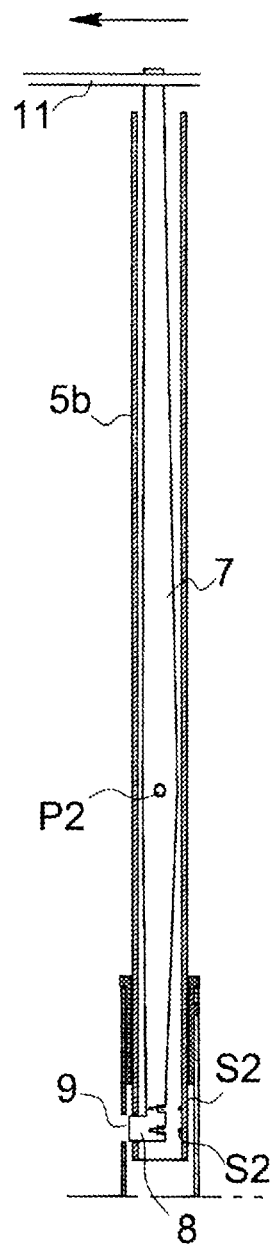
FIG. 6 is cross-sectional view of a primary part showing an unlocked state of the column support locking means of the push handle.

In this embodiment, as shown in FIG. 5 and FIG. 6, column support locking means is constituted of a pair of actuating arms 7 that have respective extension lock pieces 8 and extend in parallel and lock holes 9 facing the extension lock pieces 8.

In the illustrated example, the plate-like actuating arm 7 is fitted and inserted in the hollow of each second cylindrical portion 5b, and a lower end of this arm has the extension lock piece 8 that extends to an upper position of the first cylindrical portion 5a and outwardly protrudes.

Here, the extension lock piece 8 protrudes toward the push handle central side in the column support portion 5 that is closer to a later-described extension unlocking operating portion 12, and the lock hole 9 is likewise opened on the push handle central side of the first cylindrical portion 5a and the second cylindrical portion 5b.

On the other hand, in the column support portion 5 that is apart from the extension unlocking operating portion 12, although not shown, the extension lock piece 8 protrudes toward the push handle outer side, and the lock hole 9 is likewise opened on the push handle outer side of the first cylindrical portion 5a and the second cylindrical portion 5b.

On the other hand, the lock hole 9 is formed in an upper part of the first column support portion 5a at a position where it faces the extension lock piece 8, and the extension lock piece 8 has a size enabling protrusion and retraction.

The actuating arm 7 is pivotally attached to a middle position in the second cylindrical portion 5b through a pin P2, and the extension lock piece 8 can be protruded or retracted in the lock hole 9 when this arm is pivotally moved in the hollow of the column support portion 5.

Further, a compression spring S2 as handle lock urging means is interposed between the second column support portion 5b and the extension lock piece 8, and it urges the extension lock piece 8 in a locking direction.

[Extension Unlocking Operating Portion]

Furthermore, an interlocking rod 11 is fitted and inserted in the holding rod portion 6, and the interlocking rod 11 is supported by bearing portion 6a and 6b so as to be slidable in the longitudinal direction of the holding rod portion 6.

The upper ends of the actuating arms 7 are fixed to the interlocking rod 11, respectively, and one end portion of the interlocking rod 11 is fixed to the button-like extension unlocking operating portion 12 that is retractable on the outer side of the holding rod portion 6.

[Extension and Contraction of Column Support Portion]

Thus, in case of contracting the extended column support portion, when the extension unlocking operating portion 12 is pressed to push in the interlocking rod 11 toward the left-hand side in the drawing, each of the pair of actuating arms 7 is inclined in a counterclockwise direction in the drawing with the pivot P2 functioning as a supporting point, and the extension lock piece 8 (see FIG. 5) retired in the lock hole 9 is removed from the lock hole 9 against the urging force (see FIG. 6).

As a result, since unlocking is effected, each second cylindrical portion 5b is moved down and inserted into each first cylindrical portion 5a, thereby contracting each column support portion 5.

In case of extension, each second cylindrical portion 5b is moved up and taken out as it is.

In this case, the extension unlocking operating portion 12 is pushed in, the extension lock piece 8 is pulled up while being moved in an unlocking direction, and the extension unlocking operating portion 12 is released near the lock hole 9 to put the extension lock piece 8 into the lock hole 9 by the urging force.

Alternatively, the extension lock piece 8 may be urged in the locking direction without operating the extension unlocking operating portion 12, and it may be slid along an inner wall surface of the first cylindrical portion 5a in this state.

In this case, when the second cylindrical portion 5b moves up and the extension lock piece 8 is fit in the lock hole 9, the extension lock piece 8 is put into the lock hole 9 by the urging force, and the second cylindrical portion 5b and the first cylindrical portion 5a are locked to enable use as a handle.

As a result, the push handle 4 can be contracted and entirely fitted in the accommodating groove portion formed on the loading platform surface 2 at the time of accommodation, and the push handle 4 can be extended to facilitate hand-pushing at the time of use.

[Folding or Unfolding Configuration]

Figure 7:
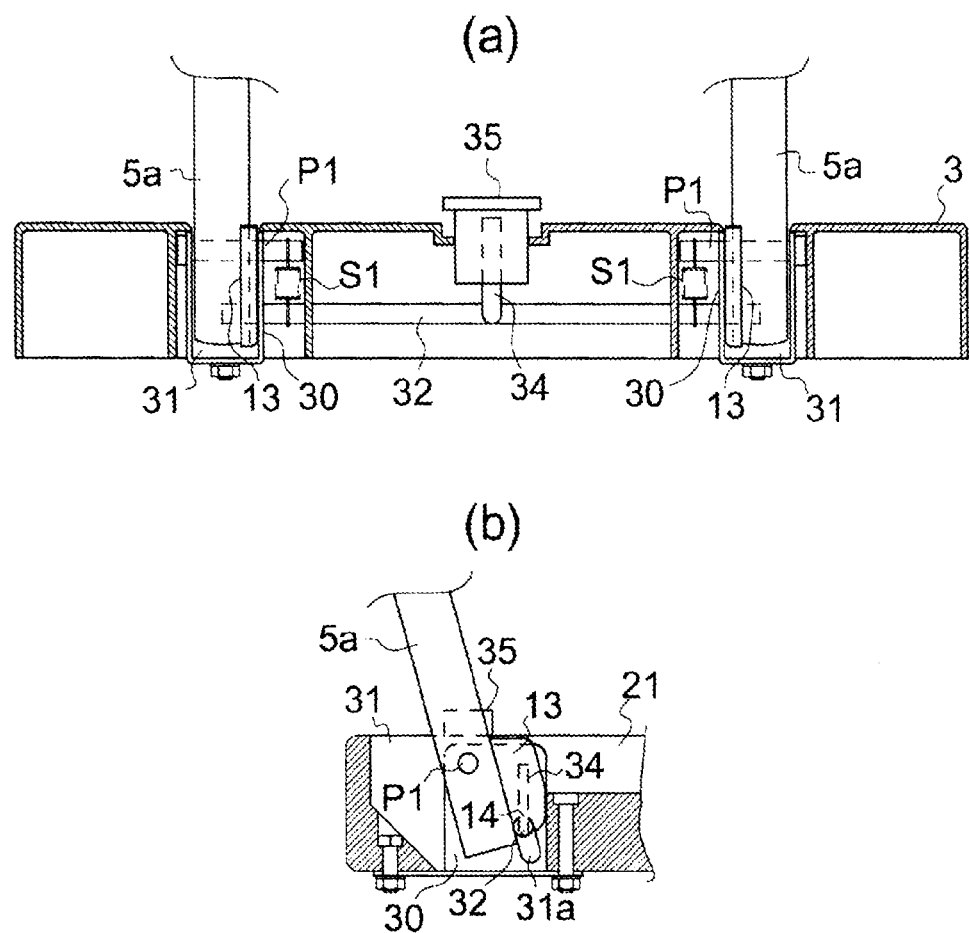
FIG. 7(*a*) is a lateral cross-sectional view showing a locked state of unlocking means of the push handle and FIG. 7(*b*) is a vertical cross-sectional view of the primary part.
Figure 8:
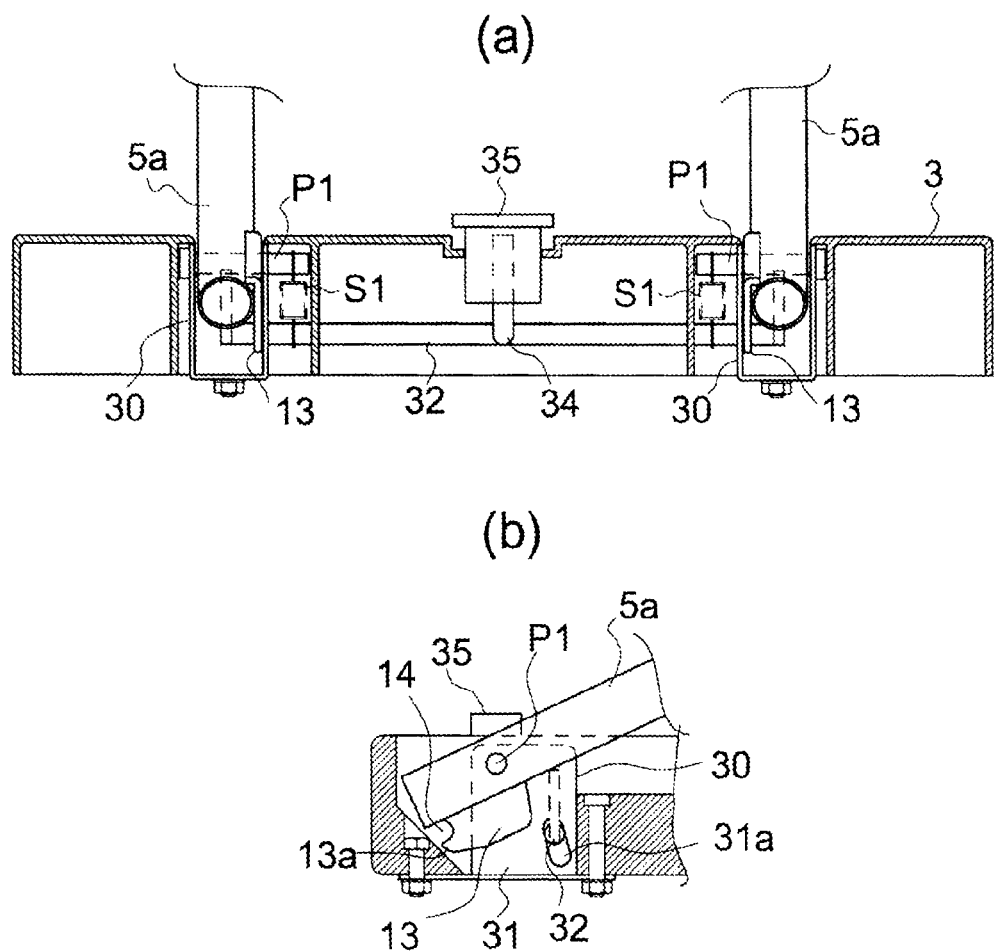
FIG. 8(a) is a lateral cross-sectional view showing an unlocked state of the unlocking means of the push handle and FIG. 8(b) is a vertical cross-sectional view of the primary part.
Figure 9:
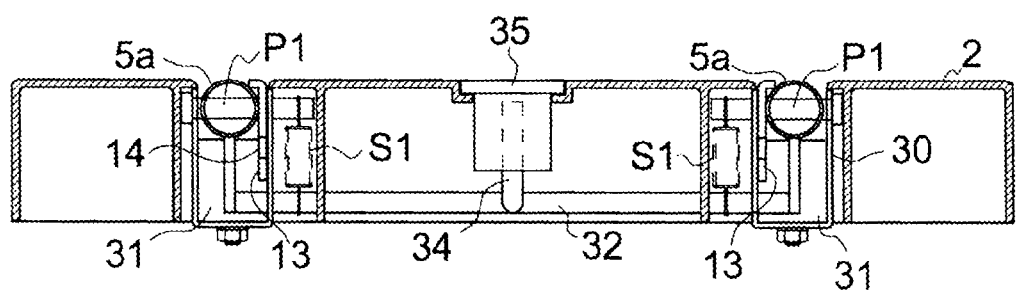
FIG. 9(a) is a lateral cross-sectional view showing a folded posture of the push handle when an unlocking operating portion is operated and FIG. 9(b) is a vertical cross-sectional view of the primary part.
Figure 9:
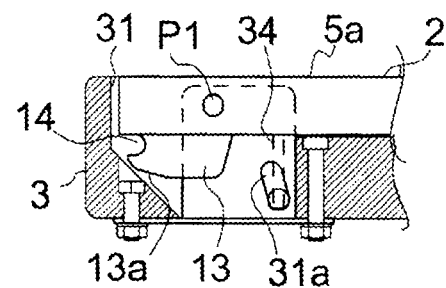

A folding or unfolding configuration of the push handle 4 will now be described with reference to FIG. 7 to FIG. 9.

As shown in FIG. 7(a) to FIG. 9(a), a lower part of each first cylindrical portion 5a is inserted into a handle attachment hole 31 formed in the loading platform portion 3, and it is pivotally attached by a pivot P1 fixed to an upper part of the hole 31.

In the illustrated example, the pivot P1 is disposed to an upper portion of each channel-like bracket 30 which is fixed in the loading platform portion 3 and provided along left and right wall surfaces of the hole 31.

The handle attachment hole 31 communicates with the accommodating groove portion 21 in which the column support portion 5 is fitted, and it is formed into a space having a shape on which the lower part of the first cylindrical portion 5a does not impinge when rotating the column support portion 5 from a raised unfolded posture to a folded posture that the column support portion 5 is inclined and horizontally inserted in the loading platform portion 3 (see FIG. 7(b) to FIG. 9(b)).

Further, the accommodating groove portion 21 is formed in such a manner that that the column support portion 5 horizontally folded with the pivot P1 functioning as the supporting point can be adjusted and fitted in and the upper surface of the column support portion 5 can be level with the loading platform surface 2 as shown in FIG. 9(b).

An unfolding lock pin 32 that locks each column support portion 5 in the unfolded posture is provided in each handle attachment hole 31, and a latch piece 13 that engages with the unfolding lock pin 32 is secured to the lower part of the first cylindrical portion 5a.

In the latch piece 13, an engagement hole 14 that engages with the unfolding lock pin 32 is downwardly opened by notching a base end lower surface that is in contact with the first cylindrical portion 5a, and the latch piece 13 has a substantial hook shape in which a surface continuous with the engagement hole 14 from a protruding end of the latch piece 13 is set to a curved surface 13a having a width narrowing toward the lower side.

The unfolding lock pin 32 is formed of one horizontally extending rod material common to the left and right column support portions 5, it is inserted into an elongate hole 31a formed in a sidewall of the bracket 30 provided on a peripheral wall of the handle attachment hole 31 to be movable along the vertical direction in the loading platform portion 3.

Further, in this embodiment, each coil spring S1 that urges the unfolding lock pin 32 in the locking direction (an upward direction in the drawing) is interposed between the pivot P1 and the unfolding lock pin 32.

Furthermore, an unlocking pedal 35 that protrudes upwards and is retractable is provided on the loading platform surface 2, and an actuating bar 34 is fixed between the unlocking pedal 35 and the unfolding lock pin 32.

When the unlocking pedal 35 is pressed down from the unfolded state (the locked state) in which the push handle 4 is raised, the unfolding lock pin 32 is pushed down from a locking position through the actuating bar 34 against the urging force.

As a result, since the unfolding lock pin 32 disengages from the engagement hole 14 of the latch piece 13, each column support portion 5 can be rotated into the horizontal folded posture from the unfolded posture through each first cylindrical portion 5a with the pivot P1 functioning as the supporting point.

When force from above is no longer applied to the unlocking pedal 35, the unlocking pedal 35 is pushed up through the unfolding lock pin 32 and the actuating bar 34 by the urging force of the coil spring S1, whereby it is restored to an original standby posture.

Since the above-described structure is adopted, the push handle 4 can be completely fitted in the accommodating groove portions 21 and 22 provided on the loading platform surface 2 by contracting the column support portions 5 and folding the push handle 4.

Furthermore, the push handle 4 is pivotally attached to the loading platform portion 3, and it can be pivoted to be folded and unfolded as it is.

Moreover, since the wheels W1 and W2 can be widely arranged along the corners of the loading platform surface 3, conveyance based on stable hand-push traveling can be performed.

[Embodiment 2]

Figure 10:
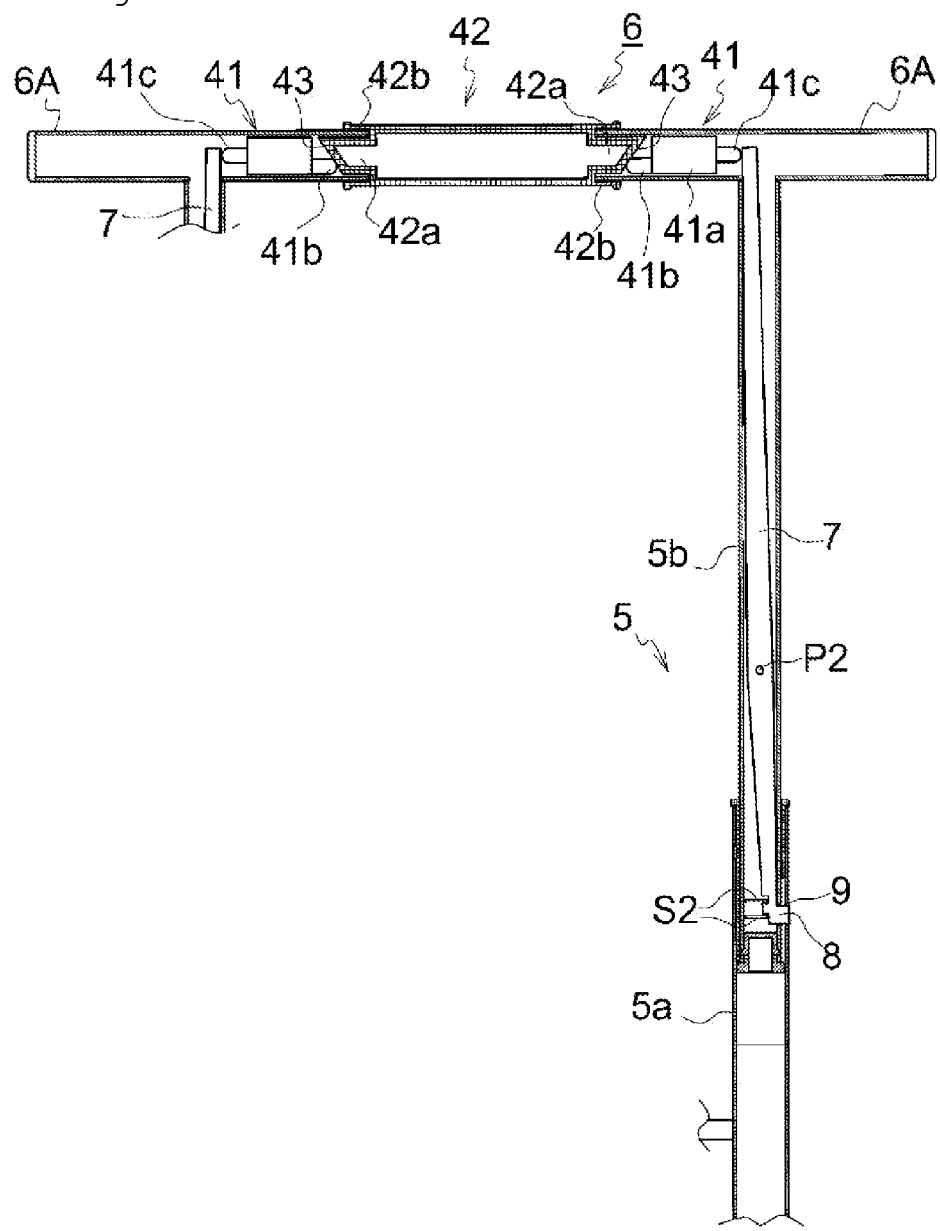
FIG. 10 is a cross-sectional view of a primary part showing an unlocked state of column support locking means of a push handle according to Embodiment 2.
Figure 11:
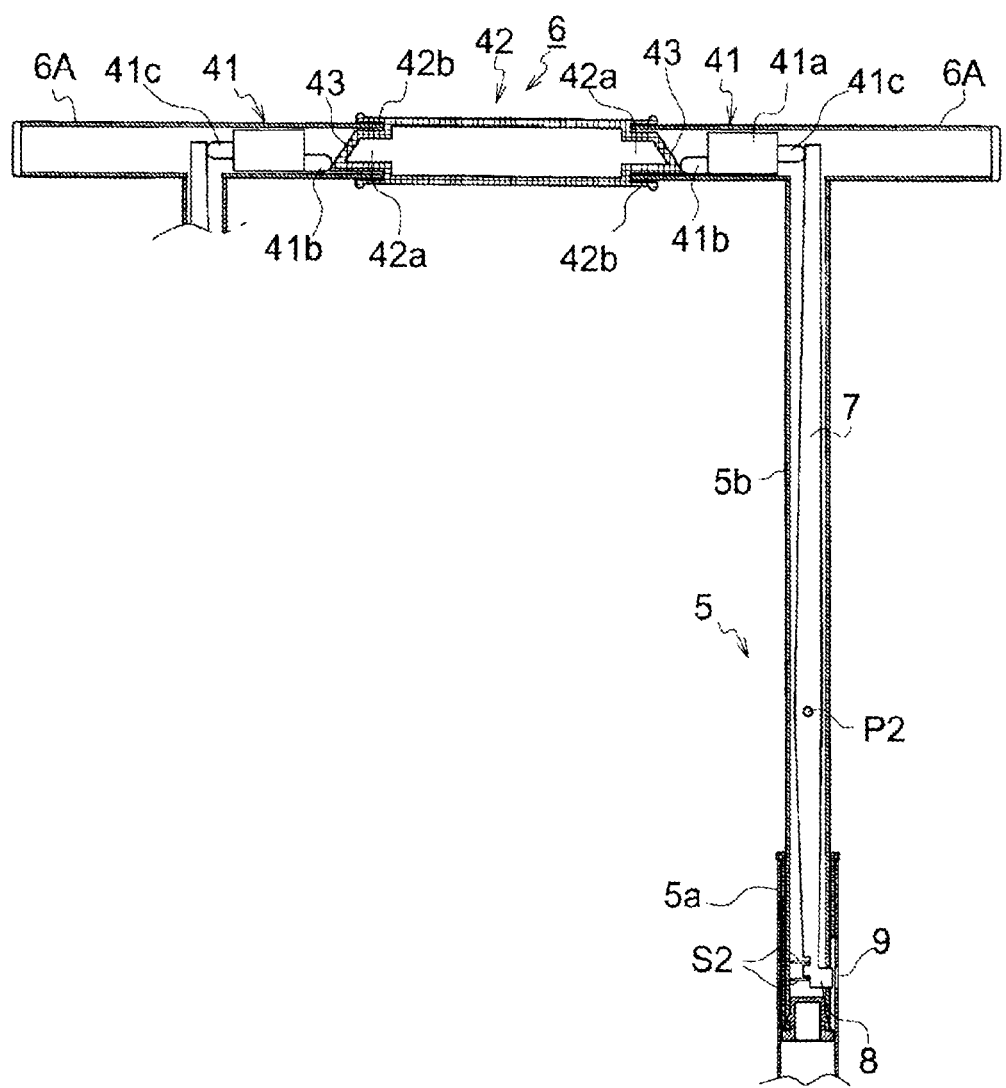
FIG. 11 is a cross-sectional view of a primary part showing locking of the column support locking means of the push handle according to Embodiment 2.

FIG. 10 and FIG. 11 show an embodiment having a different extending and contracting operation configuration of column support portions 5.

This extending and contracting operation configuration has an extension unlocking operating portion 42 having a rotary grip shape that is provided at the center of a holding rod portion 6 and rotates on an axial line of the holding rod portion 6 and sliding bodies 41 that slide in the holding rod portion based on displacement of the extension unlocking operating portion 42 in place of the push button type extension unlocking operating portion 12 that is retractable on the outer side of the holding rod portion 6 in Embodiment 1.

Further, an extension lock piece 8 of an actuating arm 7 protrudes to a push handle outer side, and a lock hole 9 is likewise opened on the push handle outer side of a first cylindrical portion 5a and a second cylindrical portion 5b.

Since other structures are equal to those in Embodiment 1, like reference numerals denote like structures to omit a description thereof.

That is, the holding rod portion 6 is constituted of a pair of left and right holding component portions 6A each of which is formed of a pipe laterally fixed to an upper end of each of the left and right second cylindrical portions 5b and the extension unlocking operating portion 42 that is rotatably borne on inner end sides of the pair of holding component portions 6A and provided at a central position of the holding rod portion 6.

The extension unlocking operating portion 42 has at both ends of its cylinder inclined convex portions 42a having symmetrical inclined surfaces 43a, each of which has a tapered end, formed at ends thereof, and fitting groove portions 42b in which the ends of the holding component portions 6a are fitted are formed on outer peripheries of the inclined convex portions 42a so as to surround the same with gaps therebetween, respectively.

Additionally, the ends of the holding component portions 6a fitted in the fitting groove portions 42b axially support both the ends of the extension unlocking operating portion 42 to allow its rotation.

Further, each sliding body 41 that is slidable along a longitudinal direction of each holding component portion 6a is interposed between the inclined convex portion 42a and the actuating arm 7 in the holding component portion 6a.

In the sliding body 41, a lower contact shaft portion 41b whose inner side is arranged on a lower side and an upper contact shaft portion 41c whose outer side is arranged on an upper side are integrally provided to protrude from both ends of a laterally-facing columnar main body 41a.

The sliding body 41 must slide without changing a vertical positional relationship of the contact shaft portions, and it is preferable to, e.g., provide a horizontally extending protrusion on an inner wall of the holding component portion 6a and also providing on the sliding body 41 a guide groove in which the protrusion is fitted or to adopt posture maintaining means for coupling the upper contact shaft portion 41c with the upper end of the actuating arm 7.

As shown in FIG. 11, in the extension unlocking operating portion 42, a position at which the inclined surface 43 of each inclined convex portion 42a gradually upwardly extends to the outside is a locking operating position at which an extension lock piece 8 of the actuating arm 7 is put into a lock hole 9, and the lower contact shaft portion 41b of the sliding body 41 is in contact with a lower part of the inclined surface 43 of the inclined convex portion 42a whilst the upper contact shaft portion 41c is in contact with the upper end of the actuating arm 7.

Since the actuating arm 7 is constantly urged in a locking direction by a compression spring S2, the upper end of the actuating arm 7 presses the sliding body 41 to the lower part of the inclined surface 43 of the inclined convex portion 42a through the upper contact shaft portion 41c.

Thus, when contracting each column support portion 5 locked at an extending position, the lower contact shaft portion 41b of the sliding body 41 is pushed toward the outer side by rotating the extension unlocking operating portion 42 and rotating the inclined surface 43 of each inclined convex portion 42a 180° as shown in FIG. 10 to displace the inclined surface 43 of the inclined convex portion 42a to a position where it gradually downwardly extends toward the outer side, whereby the upper contact shaft portion 41c can push and move each actuating arm 7 toward the push handle outer side against urging force of each actuating arm 7.

As a result, each actuating arm 7 is inclined and moved to the handle central side with a pivot P2 functioning as a supporting point, and the extension lock piece 8 put in the lock hole 9 is taken out from the lock hole 9 (see FIG. 10).

As a result, since unlocking is effected, each second cylindrical portion 5b can be moved down and inserted into each first cylindrical portion 5a, thereby contracting each column support portion 5.

At the time of extension, each second cylindrical portion 5b is moved up and pulled out as it is. At this time, each extension lock piece 8 is urged in the locking direction and slides along the inner wall surface of the first cylindrical portion 5a in this state.

Further, when each second cylindrical portion 5b is moved up and the extension lock piece 8 is fitted in the lock hole 9, the extension lock piece 8 is put into the lock hole 9 by the urging force, and the second cylindrical portion 5b and the first cylindrical portion 5a are locked, thereby allowing use as a handle.

In the foregoing embodiment, the extension unlocking operating portion 42 may perform urging to provide such a locking posture as depicted in FIG. 11 by using urging means.

Furthermore, in the present invention, the extending and contracting operation configuration of the column support portions is not restricted each embodiment described above, and any configuration can suffice as long as the extension lock piece can be fitted in the lock hole to be locked at the extending position of each column support portion or the extension lock piece is removed from the lock hole to enable contraction of each column support portion at the time of contraction.

Besides, the present invention is not restricted to the foregoing embodiments, and it can be of course designed and modified in many ways without departing from the scope of the invention.

The invention claimed is:

1. A hand truck comprising:
    a loading platform portion which has wheels on a lower surface thereof and has a loading platform surface on an upper surface thereof;
    a push handle which has a lower portion pivotally fitted on the loading platform portion and is capable of being folded or unfolded;
    an accommodating groove portion which is formed by concaving the loading platform surface to accommodate the push handle when the push handle is folded,
    wherein the push handle comprises:
        a pair of column support portions that are extendable and contractible in a vertical direction;
        a holding rod portion that is integrally interposed between upper ends of the pair of column support portions and extends toward left and right outer sides of the column support portions; and
        a column support lock member that locks an extended posture of the column support portions,
        wherein an entire length of the column support portion when contracted is shorter than one of longitudinal and lateral lengths of the loading platform surface, and the holding rod portion has an entire length shorter than the other of the longitudinal and lateral lengths of the loading platform surface and has an external shape that allows fitting in a holding rod portion accommodating groove portion of the accommodating groove portion on the loading platform surface when the push handle is folded, and
        an unfolding lock member that locks the push handle in an unfolded posture when the push handle is raised,
    a holding hole used for carrying the hand truck when folded, wherein said holding hole is vertically pierced in the loading platform portion along an outer side of the holding rod portion accommodating groove portion, and
    a wall portion on an outer side of the holding rod portion accommodating groove portion that is in contact with the holding hole is notched to form a notch portion,
    wherein the notch portion connected with the holding hole enables taking out the holding rod portion fitted in the holding rod portion accommodating groove portion from the holding rod portion accommodating groove portion.

2. The hand truck according to claim 1,
    wherein the accommodating groove portion comprises: a pair of left and right column support accommodating groove portions in which the column support portions of the handle are fitted; and the holding rod portion accommodating groove portion which extends in a direction orthogonal to the column support accommodating groove portions at halfway positions of the column support accommodating groove portions and in which the holding rod portion is fitted, and each of the left and right column support accommodating groove portions extends from a handle attachment hole, which is close to one end of the loading platform surface and has a lower part of one of the column support portions of the handle pivotally fitted therein, to the other end of the loading platform surface, and is opened at the other end of the loading platform surface.

3. The hand truck according to claim 2, wherein each of the column support accommodating groove portions communicates with corresponding one of handle attachment holes formed in the loading platform portion, and the column support accommodating groove portions are set in such a manner that the column support portions are fitted in the column support accommodating groove portions to be substantially level with the loading platform surface when the column support portions are horizontally folded, and a pair of latch portions that are raised toward the inner side and prevent the column support portions from falling from the column support accommodating groove portions when the column support portions are fitted are provided on both sides of each of the column support accommodating groove portions in a width direction.

4. The hand truck according to claim 1 or 2, wherein each of the column support portions of the push handle comprises: a first cylindrical portion pivotally fitted in the loading platform portion; and a second cylindrical portion that is vertically slidably fitted in the first cylindrical portion and includes an upper end secured to the holding rod portion to enable communication of inner hollow part thereof, and the column support lock member comprises: an actuating arm which is fitted and inserted in the hollow part of the second cylindrical portion, has an extension lock piece at a lower end thereof, pivotally fitted in a halfway position of the second cylindrical portion, and enables the extension lock piece to be expandable and retractable with respect to a lock hole formed in the first column support portion; a handle lock urging member that urges the extension lock piece of the actuating arm in a locking direction, and an extension unlocking operating portion that is provided to the holding rod portion and displaces the actuating arm in the unlocking direction.

5. The hand truck according to claim 1, wherein an unfolding lock member of the handle comprises: an unfolding lock pin that has both ends each protruding into corresponding one of handle attachment holes formed in the loading platform portion and is movable in the vertical direction; an unfolding urging member that urges the unfolding lock pin in a locking direction; an unlocking operating portion that retractably protrudes from the loading platform surface and is coupled with the unfolding lock pin; and a latch piece that is fixed to one of the column support portions and has an engagement hole that engages with the unfolding lock pin when the push handle is unfolded.

6. The hand truck according to claim 5, wherein the unlocking operating portion is arranged at the center between the handle attachment holes.

* * * * *